March 6, 1956

H. C. FISHER ET AL 2,737,444

ALUMINUM OXIDE CATALYST CARRYING MATERIAL
AND PROCESS OF MAKING SAME

Filed June 21, 1952

INVENTORS
HENRY C. FISHER
HERBERT F. G. UELTZ

By George Crompton
Attorney

United States Patent Office 2,737,444
Patented Mar. 6, 1956

2,737,444

ALUMINUM OXIDE CATALYST CARRYING MATERIAL AND PROCESS OF MAKING SAME

Henry C. Fisher and Herbert F. G. Ueltz, Worcester, Mass., assignors to Norton Company, Worcester, Mass., a corporation of Massachusetts Application June 21, 1952, Serial No. 294,784

8 Claims. (Cl. 23—143)

This invention relates to aluminum oxide catalyst carrying material and to a process of making it.

One object of the invention is to provide aluminum oxide of very low bulk specific gravity in particle size of 20 grit size and finer which therefore can be readily "fluidized," thus accelerating any chemical process which is promoted by a catalyst carried by the aluminum oxide. In this connection any mass of particles, can be suspended in any gas provided the gas is forced through the mass of particles at high enough velocity. The smaller the particle size of the material the lower is the minimum velocity required for suspending the particles. Also the lower the bulk specific gravity of the mass of particles the lower is the minimum velocity required for suspending the particles. When a mass of particles is suspended in a gas the mass is said to be "fluidized." A fluidized mass acts very much like a liquid and has an upper level which rises when the velocity of the gas stream is increased and falls when the velocity of the gas stream is diminished (the gas usually moves upwardly through the mass of particles).

Another object of the invention is to provide very porous aluminum oxide of the character indicated. Another object is to provide aluminum oxide which is not only of low bulk specific gravity and of particle size of about 20 grit size and finer but which is also of high purity.

Another object is to provide a simple, practical and inexpensive process for producing aluminum oxide material of the nature indicated.

Other objects will be in part obvious or in part pointed out hereinafter.

Figure 1:
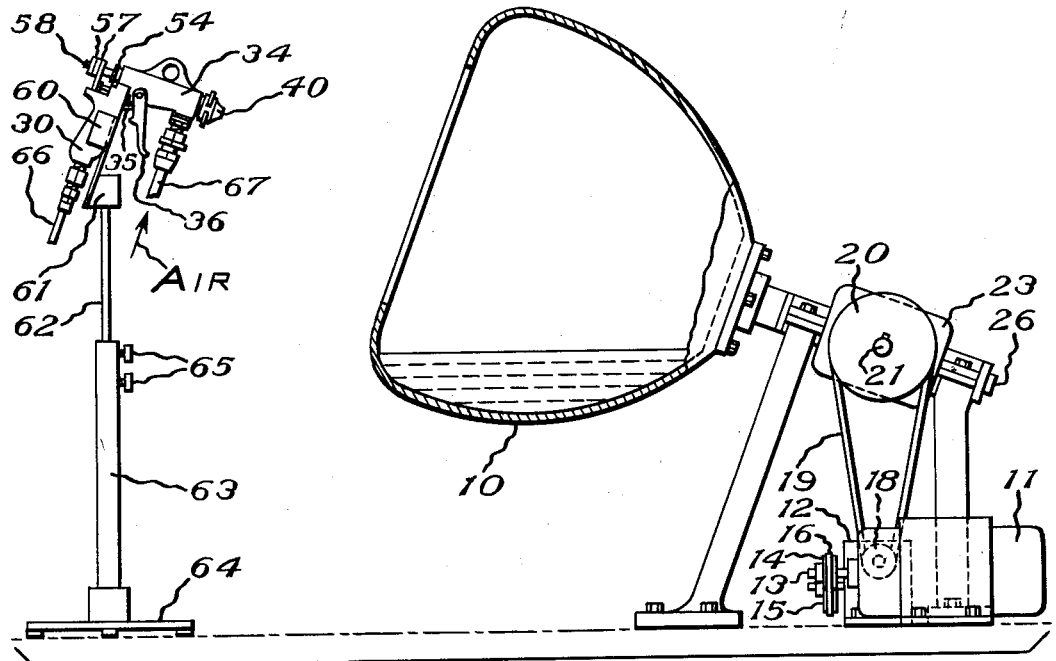
Figure 2:
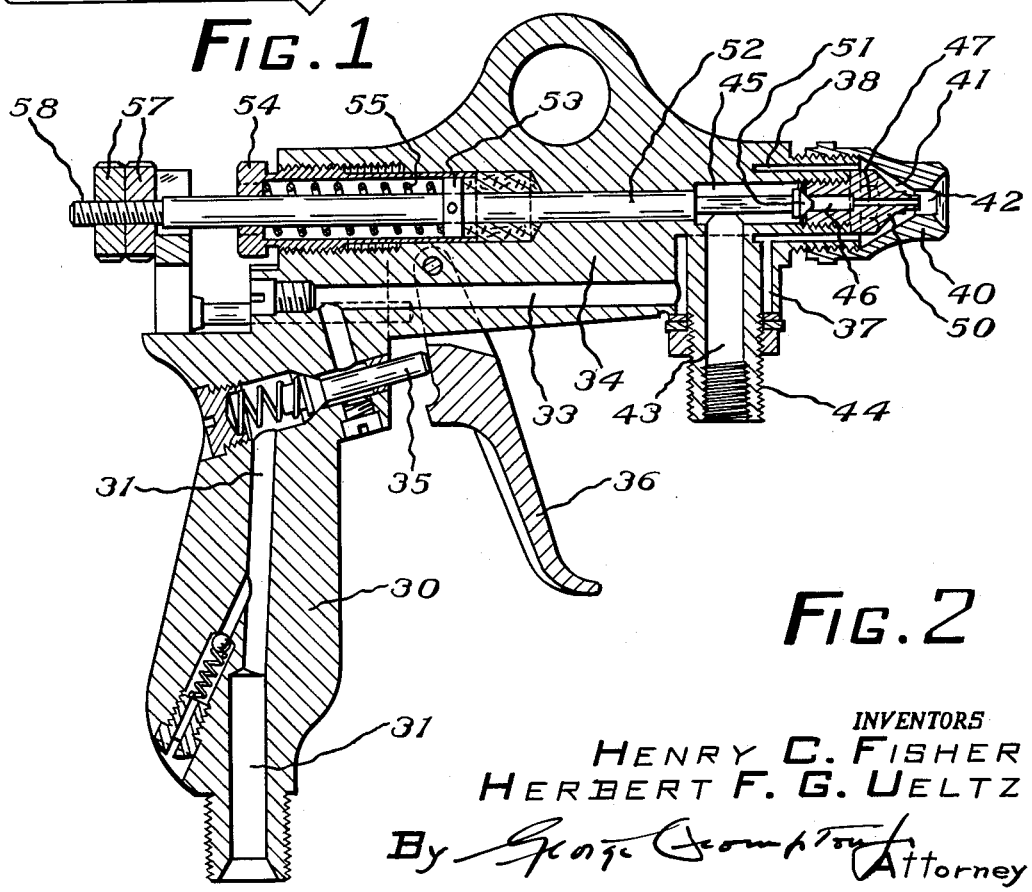

The accompanying drawings illustrate efficient apparatus for making the aluminum oxide material but our process is not limited to the use of this or similar apparatus. In the drawings, Figure 1 is a side elevation of a spray gun and stand, a cross section of a rotatable barrel and an elevation of mechanism for rotating it;

Figure 2 is a sectional view on an enlarged scale of the spray gun.

The principal steps in our process are as follows: a water solution of aluminum chloride, $AlCl_3 \cdot 6H_2O$, is sprayed into a solution of ammonia, $NH_4OH$. The spray of aluminum chloride solution should be allowed to travel a sufficient distance before landing in the ammonia solution so that spherical particles will be formed. The solvent in both cases is preferably water.

The solutions react to form aluminum hydrate, $Al(OH)_3$ and ammonium chloride, $NH_4Cl$. The latter is soluble and goes into solution in the excess of water, while the former is insoluble and forms a gel in particles of spherical shape. The reaction is $$AlCl_3 \cdot 6H_2O + 3NH_4OH = Al(OH)_3 + 3NH_4Cl + 6H_2O$$

and this reaction takes place satisfactorily at room temperatures, e. g. at 70° F., and hot day temperatures, e. g. 100° F., are not harmful nor are cold room temperatures, e. g. 50° F., harmful either. Furthermore the humidity conditions in the room are immaterial.

The fine particles of aluminum hydrate are now collected, dried and are fired at about 1450° C. (cone 16 firing conditions). The first result is to drive off the water according to the reaction $$2Al(OH)_3 \xrightarrow{Heat} Al_2O_3 + 3H_2O$$

The second result is to sinter the imperfectly united components of each particle to produce hard and reasonably strong tiny spheres of alumina which are, however, quite porous, since they were derived from alumina gel, which defines the physical condition of the aluminum hydrate.

However, we provide aluminum chloride solution in the form of a creamy suspension of a pure metal oxide powder in the water and with the aluminum chloride. Furthermore the preferred oxide is aluminum oxide, $Al_2O_3$. This is a catalyst carrier and not a catalyst itself in most reactions. But the metal oxide can be a catalyst and there are advantages in providing metal oxide which is a catalyst in the reaction in which our product is to be used. For example, nickel oxide and vanadium oxide are catalysts in certain petroleum cracking reactions. But any water stable metal oxide can be used and all metals of which there are about seventy, form oxides. Furthermore at room temperatures every one of the seventy (more or less) metals has an oxide which is a solid at ordinary temperatures, so far as we are aware. Of these many are water stable, and which are and which are not is known. In general most of the solid oxides (at ordinary temperatures) are water stable, exceptions being the oxides of alkali and alkaline earth metals.

For the aluminum chloride containing component we prefer to use a saturated (water) solution of $AlCl_3 \cdot 6H_2O$. However, we can use aluminum chloride having water of crystallization of more or less than $6H_2O$ and while it is more difficult to handle we can use anhydrous aluminum chloride, $AlCl_3$. The percentage of metal oxide of the total metal oxide plus saturated solution can vary from nothing to 65% by weight. But we prefer to use an appreciable amount of the metal oxide, to wit, from 20% to 65% by weight of the total metal oxide and saturated solution of $AlCl_3 \cdot 6H_2O$. The water of crystallization of the $AlCl_3 \cdot 6H_2O$ merges with the water of the ammonia solution during the first reaction. The concentration of ammonia in the ammonia solution should be kept at all times between 1% $NH_3$ and 30% $NH_3$ by weight and is preferably at least 26% by weight.

As an illustrative example we made some material as follows:

*Example I*

A creamy suspension of fine Bayer process alumina (quite pure, microcrystalline and of particle size about 3–15 microns) and saturated solution of $AlCl_3 \cdot 6H_2O$ in the proportion of 60% by weight alumina to 40% by weight saturated water solution was made up. This was sprayed a horizontal distance of about three feet with a drop of about two and a half feet into a rotating barrel containing ammonium hydroxide solution, 26% by weight $NH_3$ the balance water. The rate of spraying was at about two gallons an hour. The resultant particles were collected and fired in a kiln in an air atmosphere under cone 16 conditions. The resultant mass consisted of discrete tiny spheres, very porous, of practically pure alumina of crystalline structure, with a bulk density of the mass of about 65 pounds per cubic foot. This is the density of sea water and hence is equivalent to a specific gravity of about 1.04. The specific gravity of dense crystalline alumina is about 4.0 and a packing of uniform size spheres is about 70% solid (our particles were quite uniform in size) so therefore we have given a measure of the porosity of the particles which turns out to be about 55% pores by volume.

Referring now to the drawings illustrating apparatus which was used, the rotating barrel 10 was made of copper of largest diameter perpendicular to the axis about four feet. It was rotated at about 30 R. P. M. by a motor 11 and speed reduction mechanism in a casing 12 driven from the motor shaft 13 by pulleys 14 and 15 and a belt 16. The output end of the speed reduction mechanism was a pulley 18 driving a belt 19 driving a pulley 20 on a shaft 21 projecting from a casing 23. In the casing 23 were meshing bevel gears, not shown, one on the shaft 21 and another one on a shaft 26 to which the barrel 10 was attached in the manner indicated. The supports are illustrated and need not be described and no one skilled in the art needs further description of this part of the apparatus.

For spraying the creamy suspension we used a paint spray gun well illustrated in cross section in Figure 2. Briefly this comprised a grip 30 having a paint intake channel 31 connected to a channel 33 in a "barrel" 34 by means of a spring pressed valve 35 opened by a trigger 36, the channel 33 being connected by an annular channel 37 to an annular channel 38, both of the latter being in the "barrel" 34. A spray nozzle 40 was screwed onto the front end of the "barrel" 34 providing an annular channel 41 communicating with the channel 38 and with a delivery orifice 42. Air under pressure entered the gun through a channel 43 inside a threaded coupling portion 44, the channel 43 leading to a chamber 45 communicating with a large bore 46 which communicated with a fine bore 47 in an interior air nozzle 50 inside of the nozzle 40. The blast of air from the nozzle 50 atomized the creamy suspension issuing through the orifice 42 and propelled it through the air. The flow of air was controlled by a valve 51 in the chamber 45, the valve 51 being on the end of a long valve stem 52 having a collar 53 in a tube 54 containing a spring 55 urging the collar and hence the stem 52 to the right. The spring 55 would keep the valve 51 closed but the valve could be opened to any desired extent by adjusting nuts 57 on the threaded outer end 58 of the stem 52. This gun is more fully described in U. S. Patent No. 1,706,875 to A. H. Downs and so need not be further described herein.

Referring to Figure 1, the grip 30 was clamped by a clamp 60 on the end of a bracket 61 on the upper end of a rod 62 adjustably supported by a tube stand 63 having a base 64 and screws 65 to clamp and unclamp the rod 62. A hose 66 connected the channel 31 to a barrel containing the creamy suspension and containing air under a pressure of about 75 pounds per square inch to cause the suspension to flow. A hose 67 connected to the coupling portion 44 was connected to a source of air under a pressure of about 35 pounds to the square inch.

With regard to the firing conditions, while we find cone 16 conditions give particles of adequate strength and hardness for many applications and firing at cone 16 is not too expensive, we can fire at higher or lower temperatures. In the upper range of temperatures we are limited only by the melting point of alumina (2050° C.) or in some cases by the melting point of the other oxide if other oxide is used. The higher firing temperatures produce stronger and harder particles. On the low side the mass of particles is saleable if merely dried (not fired at all) as in some cases the use of the particles will sinter them to some extent (when the catalytic reaction is at elevated temperatures).

Other examples of the invention are as follows:

*Example II*

We proceed exactly as in Example I only the creamy suspension is 73% by weight nickel oxide, $NiO$, and 27% by weight saturated solution of $AlCl_3 \cdot 6H_2O$ in water. After firing at cone 16 the particles consist of porous matrix of nickel oxide and nickel aluminate. The original particle size of the nickel oxide may appropriately be about 3–15 microns but can be larger say up to 325 grit size or smaller than 3 microns if available.

*Example III*

Again proceeding as in Example I, we provide a creamy suspension 56% by weight vanadium oxide, $V_2O_3$, and 44% by weight saturated solution of $AlCl_3 \cdot 6H_2O$ in water. After firing at cone 16 the particles consist of a porous mass of aluminum and vanadium oxides. The original particle size of the vanadium oxide may appropriately be about 3–15 microns but can be larger say up to 325 grit size or smaller than 3 microns if available.

It really is unnecessary to extend the discussion by giving an example for every one of the oxides of the sixty-seven, more or less, remaining metals. As heretofore stated, an oxide of any of the metals can be used and at room temperatures every metal has an oxide which is a solid. Of course most metals have more than one oxide but any water stable solid metal oxide can be used in combination with the aluminum chloride in this invention. Naturally many oxides are too rare or too expensive for practical use. As heretofore stated our particles do not have to be catalysts per se as being porous they can be used as catalyst carriers.

While the specific process described is a good one and at present we prefer this specific variety, the process can be varied. For example, instead of spraying the solution of aluminum chloride with or without metal oxide into a water solution of ammonia, we can spray it into a chamber containing gaseous ammonia, $NH_3$. In this manner larger particles can be made. In fact they can be as large as the spraying apparatus can make them. When the solution is sprayed into the water solution of ammonia the particles, if they are to be approximate spheres, can be not substantially larger than 20 grit size since larger drops will flatten on hitting the liquid, forming particles of pancake shape. We prefer spherical particles and at present we prefer particles no larger than 20 grit size.

The product according to this invention consists of masses of roughly spherical particles at least as fine as 20 grit size having a porosity of at least 20% and consisting of a matrix of aluminum oxide alone or in combination with the oxides the masses having a bulk specific gravity between 60 and 70 pounds to the cubic foot.

While as aforesaid the particles can be merely dried and not fired at all, we prefer to fire the particles and we prefer to fire them under at least cone 12 conditions.

It will thus be seen that there has been provided by this invention aluminum oxide catalyst carrying material and a process of making the same according to which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

We claim:

1. Process for the manufacture of masses of roughly spherical particles comprising mixing aluminum chloride solution in water with enough water stable metal oxide powder to form a creamy suspension and then spraying this suspension into ammonia water, thereafter collecting and drying the particles so produced.

2. Process according to claim 1 in which the dried particles are fired under at least cone 12 conditions.

3. Process according to claim 2 in which the amount of metal oxide powder is from 20% to 65% by weight of the total metal oxide powder and solution calculated as saturated of AlCl$_3$·6H$_2$O.

4. Process according to claim 3 in which the water stable metal oxide powder is aluminum oxide.

5. Process according to claim 1 in which the amount of metal oxide powder is from 20% to 65% by weight of the total metal oxide powder and solution calculated as saturated of AlCl$_3$·6H$_2$O.

6. Process according to claim 5 in which the water stable metal oxide powder is aluminum oxide.

7. Process according to claim 1 in which the water stable metal oxide powder is aluminum oxide.

8. Process according to claim 7 in which the dried particles are fired under at least cone 12 conditions.

References Cited in the file of this patent

UNITED STATES PATENTS

| Number | Name | Date |
|---|---|---|
| 1,015,499 | Langlet | Jan. 23, 1912 |
| 1,072,034 | Richter | Sept. 2, 1913 |
| 1,682,241 | Patrick | Aug. 28, 1928 |
| 1,287,022 | Burk | June 23, 1932 |
| 1,871,793 | Horsfield | Aug. 16, 1932 |
| 1,935,176 | Connolly | Nov. 14, 1933 |
| 2,246,900 | Schulze | June 24, 1941 |
| 2,249,767 | Kistler | July 22, 1941 |
| 2,273,338 | Thomas | Feb. 17, 1942 |
| 2,296,406 | Spicer | June 22, 1942 |
| 2,450,394 | Brown | Sept. 28, 1948 |
| 2,479,110 | Haensel | Aug. 16, 1949 |
| 2,488,150 | Walden | Nov. 15, 1949 |
| 2,492,808 | Marisic | Dec. 27, 1949 |

OTHER REFERENCES

Smith: Inorganic Chemistry, Appleton-Century Co., N. Y., 1937, page 771.

Thorpe: "Dictionary of Applied Chemistry," vol. 1, page 284, fourth edition, vol. 1, Longmans, Green and Co., N. Y., September 1941.